(12) United States Patent
Lancho Doncel

(10) Patent No.: US 9,004,469 B2
(45) Date of Patent: Apr. 14, 2015

(54) SPACE SHUTTLE DAMPING AND ISOLATING DEVICE

(71) Applicant: EADS CASA Espacio S.L., Madrid (ES)

(72) Inventor: Miguel Lancho Doncel, Madrid (ES)

(73) Assignee: EADS CASA Espacio S.L., Madrid (ES)

( * ) Notice: Subject to any disclaimer, the term of this patent is extended or adjusted under 35 U.S.C. 154(b) by 101 days.

(21) Appl. No.: 13/771,381

(22) Filed: Feb. 20, 2013

(65) Prior Publication Data

US 2013/0214464 A1 Aug. 22, 2013

(30) Foreign Application Priority Data

Feb. 20, 2012 (EP) ..................................... 12382057

(51) Int. Cl.
| | |
|---|---|
| F16M 13/00 | (2006.01) |
| F16F 7/00 | (2006.01) |
| B64G 1/64 | (2006.01) |
| F16F 15/02 | (2006.01) |
| F16F 15/073 | (2006.01) |
| F16F 1/20 | (2006.01) |
| F16F 1/368 | (2006.01) |

(52) U.S. Cl.
CPC . *F16F 7/00* (2013.01); *B64G 1/641* (2013.01); *F16F 15/022* (2013.01); *F16F 15/073* (2013.01); *F16F 1/20* (2013.01); *F16F 1/368* (2013.01)

(58) Field of Classification Search
USPC .............. 267/267/7, 192, 193, 158, 160, 164, 267/152, 42–46; 244/170; 248/550, 628
See application file for complete search history.

(56) References Cited

U.S. PATENT DOCUMENTS

| | | | | |
|---|---|---|---|---|
| 3,663,048 | A * | 5/1972 | Zimmerle ..................... | 293/135 |
| 5,305,981 | A * | 4/1994 | Cunningham et al. ........ | 248/550 |
| 5,358,210 | A * | 10/1994 | Simon et al. .................. | 248/628 |
| 6,290,183 | B1 * | 9/2001 | Johnson et al. ............... | 244/170 |
| 7,249,756 | B1 * | 7/2007 | Wilke et al. ................... | 267/152 |
| 8,707,582 | B2 * | 4/2014 | Klassen et al. ................ | 36/27 |

FOREIGN PATENT DOCUMENTS

| | | |
|---|---|---|
| DE | 10141432 | 3/2003 |
| EP | 1469224 | 10/2004 |

OTHER PUBLICATIONS

European Search Report, Jul. 10, 2012.

* cited by examiner

*Primary Examiner* — Christopher Schwartz
(74) *Attorney, Agent, or Firm* — Greer, Burns & Crain, Ltd.

(57) ABSTRACT

A device used for providing dynamic isolation and damping of dynamic vibrations, in a passive way, originated in the launch vehicle of a space shuttle and reaching the payload or satellite. The device comprises a plurality of identical elementary unit elements, such that the device is designed in a modular way, allowing the individual modularity of each of the elementary unit elements. Each of the elementary unit elements is tailored and designed individually, and the complete device can be designed for each particular application and payload needed as a function of each of the elementary unit elements allowing an easy design and lower costs, for a wide range of payload applications. Each elementary unit element comprises a spring component and a damping component, such that the functionalities provided for each component are separated and can be individually tailored, thus providing a device having a wider range of adaptation capabilities.

13 Claims, 7 Drawing Sheets

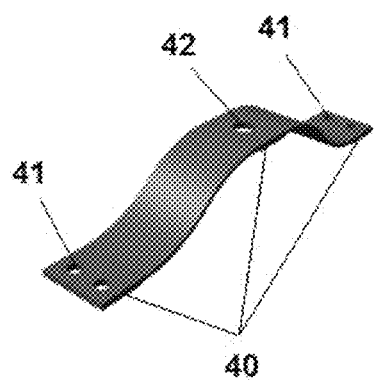 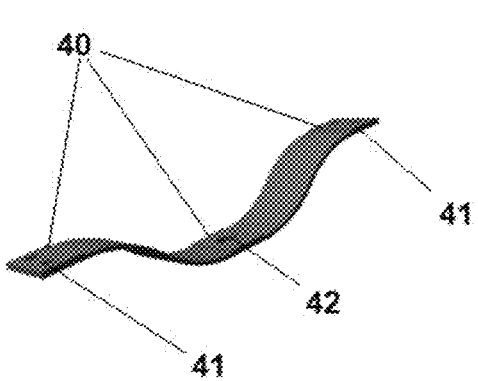
FIG. 3a  FIG. 3b
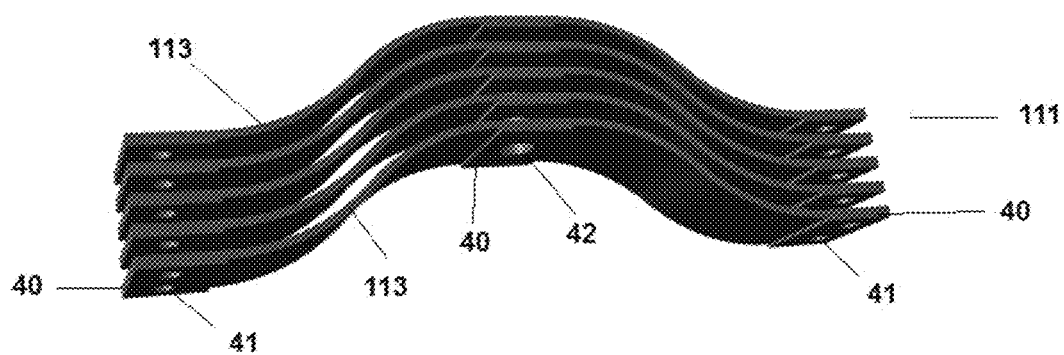
FIG. 4a

200/300 < 1
α < 45°

200/300 = 1
α = 45°

200/300 > 1
α > 45°

SPACE SHUTTLE DAMPING AND ISOLATING DEVICE

CROSS-REFERENCES TO RELATED APPLICATIONS

This application claims the benefit of the European patent application No. 12382057.3 filed on Feb. 20, 2012, the entire disclosures of which are incorporated herein by way of reference.

FIELD OF THE INVENTION

The present invention relates to a device used for providing dynamic isolation and damping of dynamic vibrations originated in the launch vehicle of a space shuttle and reaching the satellite.

BACKGROUND OF THE INVENTION

A space shuttle is designed for carrying payloads or satellites into different space orbits. Each space shuttle is a launch system comprising an external tank supplying the liquid oxygen and hydrogen fuel to the main engines, two solid rocket boosters providing the thrust needed for the lift-off of the whole space shuttle, and a satellite, orbiter or payload which has to be placed in a required orbit in the outer space. The space shuttle is designed as a function of the payload that is needed to be put into orbit in space.

During lift-off and ascent, the external tank in the space shuttle supplies the fuel and oxidizer under pressure to the main engines in the space shuttle. In the known prior art, these external tanks comprise two separate tanks, one comprising the liquid oxygen fuel and the other one comprising the liquid hydrogen fuel, such that each of these tanks is joined to the structure of the external tank by means of a metallic structure isolating and damping the vibrations and loads transmitted to the two tanks comprising the liquid fuel. Further developments have been made and the external tanks no longer comprise the mentioned configuration, but the whole external tank is rather divided internally into two chambers, one chamber comprising liquid hydrogen fluid and another one comprising liquid oxygen fuel, both chambers being separated by means of a membrane. This configuration results in the payload in the space shuttle receiving very high loads and vibrations which have been transmitted by the external structure. It is therefore needed to develop a device that is able to properly dampen and isolate the payload from these loads and vibrations. The device that has to be developed must be a device having, at the same time, enough stiffness, flexibility and dampening properties, and this would ideally need to be valid for every space shuttle and for every payload in it.

It is known from the state of the art, as per document U.S. Pat. No. 7,249,756 B1, a mounting system passively damped and isolated from vibrations, comprising a plurality of elements, each element having a very low profile, such that the system that is able to be used in a space shuttle for an application as the one just mentioned. However, the mounting system in U.S. Pat. No. 7,249,756 B1 presents several problems and disadvantages: as the damping and isolation functionalities in each of the elements forming the system are functionally and structurally joined, the design and characterization of these elements has to be made for each single application where the system is going to be used, therefore not allowing an easy and unique design. Besides, the same element configuration cannot be used for different space shuttles and different payloads, but rather need to be redesigned for each particular case. Furthermore, this design would not allow a growth potential and flexibility of redesign as, if for example higher stiffness is required, the element needs to be made wider and the number of elements would prevent this redesign from being placed within the space shuttle structure. Even one more disadvantage of the system in U.S. Pat. No. 7,249,756 B1 would be that it could not be properly used in composite material structures, which are the structures mostly used at present for space applications.

The present invention is intended to solve said disadvantages and limitations in the prior art.

SUMMARY OF THE INVENTION

In a first aspect, the present invention discloses a device used for providing dynamic isolation and damping of dynamic vibrations, in a passive way, originated in the launch vehicle of a space shuttle and reaching the payload or satellite. The device of the invention comprises a plurality of identical elementary unit elements, such that the device is designed in a modular way, allowing the individual modularity of each one of the elementary unit elements: therefore, each of the elementary unit elements is tailored and designed individually, such that the complete device can be designed for each particular application and payload needed as a function of each of the elementary unit elements, thus allowing an easy design and lower costs, for a wide range of payload applications.

Each of the elementary unit elements comprises a spring component and a damping component, such that the functionalities provided for each component are separated and can be individually tailored, thus providing a device having a wider range of adaptation capabilities.

Furthermore, the elementary unit elements are preferably manufactured of a composite material, so that the device of the invention can be used in composite structures within a space shuttle.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

FIGS. 3a and 3b show detailed views of the elementary units forming the spring component in the elementary unit element configuring the space shuttle damping and isolating device according to the present invention.

FIGS. 4a, 4b and 4c show detailed views of the plurality of elementary units forming the spring component in the elementary unit element configuring the space shuttle damping and isolating device according to the present invention.

DETAILED DESCRIPTION OF THE PREFERRED EMBODIMENTS

Figure 1A:
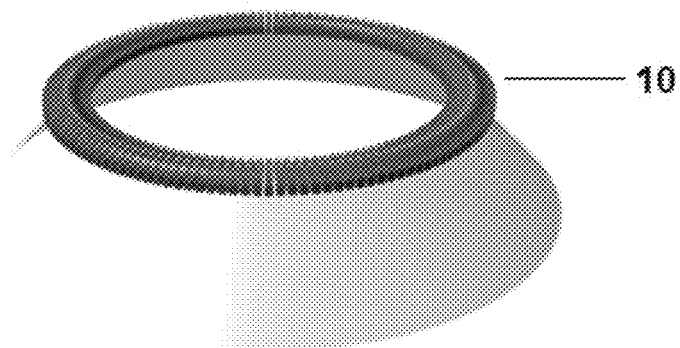
FIGS. 1a, 1b and 1c show a schematic general view of the configuration of a space shuttle damping and isolating device according to the present invention, showing the plurality of elementary unit elements for different payload configurations.
Figure 1B:
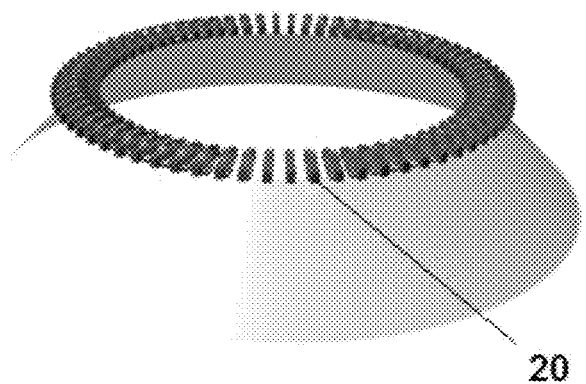

The invention discloses a device 10 used for providing dynamic isolation and damping of dynamic vibrations, in a passive way, originated in the launch vehicle of a space shuttle and reaching the payload or satellite. The device 10 of the invention comprises a plurality of identical elementary unit elements 20, such that the device 10 is designed in a modular way, allowing the individual modularity of each one of the elementary unit elements 20. FIGS. 1a, 1b and c show schematic views of the device 10 according to the present invention, comprising a plurality of elementary unit elements 20, this device 10 being located at any position in the upper stage structures of the launch vehicle, in such a way that this device 10 interferes in the load path from the launch vehicle to the space shuttle.

Figure 1C:
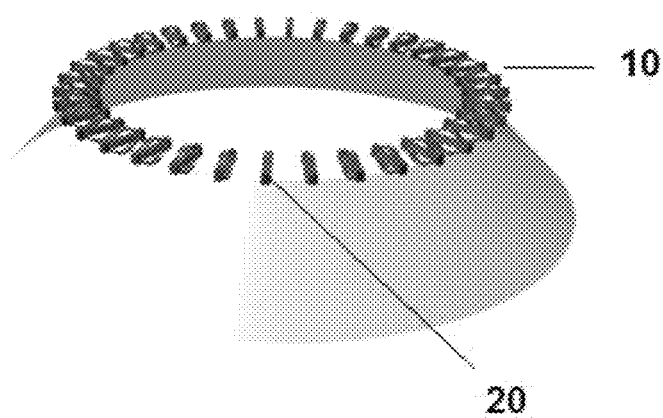

As shown in FIGS. 1a, 1b and 1c, the proposed baseline where the device 10 of the invention is set has a diameter of 1780 mm, which represents a standard diameter measurement for space shuttles and satellites. It is also a standard for space shuttles and satellites to have a maximum of 144 equidistance positions within the diameter of 1780 mm, such that the fixing of the device 10 is made by a fixing element in each one of these 144 positions. In the embodiment shown in FIG. 1a, the device 10 comprises 144 identical elementary unit elements 20. Because the same device 10 will be used for a wide range of space shuttles and payloads, typically in the range of 1 ton to 6 tons, the modular configuration of the device 10 will differ depending on the payload to support; for example, payloads comprised between 4.5 and 6 tons will use a device 10 comprising 144 identical elementary unit elements 20, payloads comprised between 3.5 and 4.5 tons will use a device 10 comprising 72 identical elementary unit elements 20, and payloads below 3.5 tons will use a device 10 comprising 36 identical elementary unit elements 20, for example. Other different configurations of the device 10 will also be possible, and these mentioned only represent typical embodiments.

Figure 2:
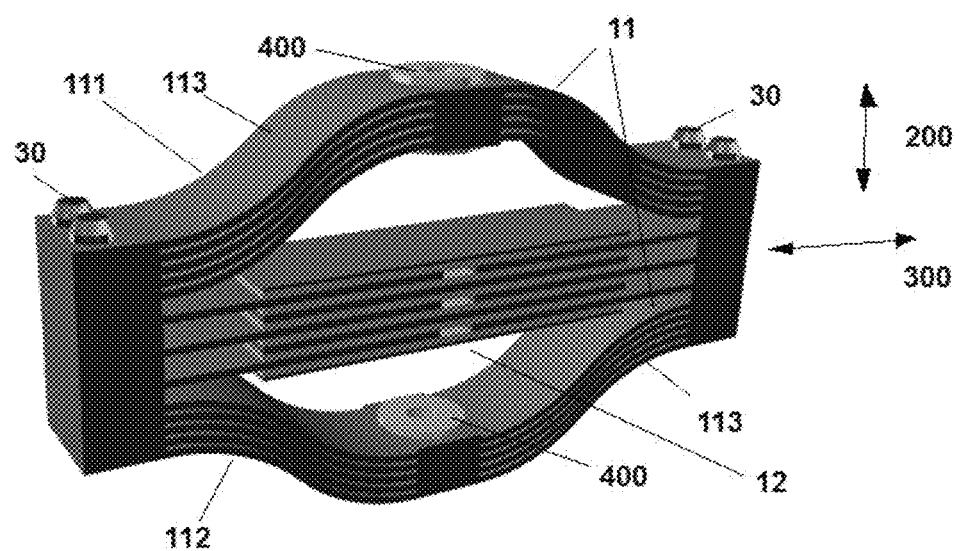
FIG. 2 shows a schematic view of the elementary unit element configuring the space shuttle damping and isolating device according to the present invention.

FIG. 2 shows a general view of each of the elementary unit elements 20 in the device 10, providing dynamic isolation and damping functions by means of a combination of a spring component 11 and a damping component 12. The spring component 11 is formed by two symmetric stacks 111 and 112, each stack 111 or 112 comprising a plurality of leaf springs 113. The damping component 12 is formed by at least one stack 125 comprising a plurality of damping leafs 120. The stacks 111 and 112 in the spring component 11 and the at least one stack 125 forming the damping component 12 (the embodiment shown in the attached Figures shows a damping component 12 comprising three stacks 125) are joined together at their ends by joining elements 30, preferably by mechanically preloaded bolt elements, as shown in FIG. 2. Besides, inserts 400, typically screwed, are assembled at the top and bottom parts of the two symmetric stacks 111 and 112, in order to provide mechanical interfaces with the adjacent structures to which the device 10 is joined.

One of the main advantages of the device 10 of the invention comes from the configuration of each elementary unit element 20 comprising a spring component 11 and a damping component 12 working in a quasi-parallel mode as follows: the working way of the elementary unit element 20 is based in the combination of the axial-vertical 200 relative displacement (up-down) of the two symmetric stacks 111 and 112, providing the main stiffness properties for each elementary unit element 20, together with the radial-horizontal 300 relative displacement (right-left) of the two symmetric stacks 111 and 112 joining the at least one stack 125 forming the damping component 12 at their ends, providing the main damping properties for each elementary unit element 20. The geometry and configuration of the leaf spring 113 in the stacks 111 and 112 drives the ratio of both relative displacements, of the axial-vertical 200 relative displacement (up-down) and of the radial-horizontal 300 relative displacement (right-left), therefore providing a multiplication factor (<1 or >1) that can be defined according to design needs. The fact that this ratio of relative displacements can be different from 1, results in the working mode of each elementary unit element 20 being not completely parallel, but quasi-parallel. This has the advantage that the design of the damping properties and of the stiffness properties can be made individually and through the ratio just mentioned, in such a way that: when the ratio is below 1, the damping properties in the elementary unit element 20 are higher than the stiffness properties; however, when the ratio is above 1, the stiffness properties in the elementary unit element 20 are higher than the damping properties.

Figure 7A:
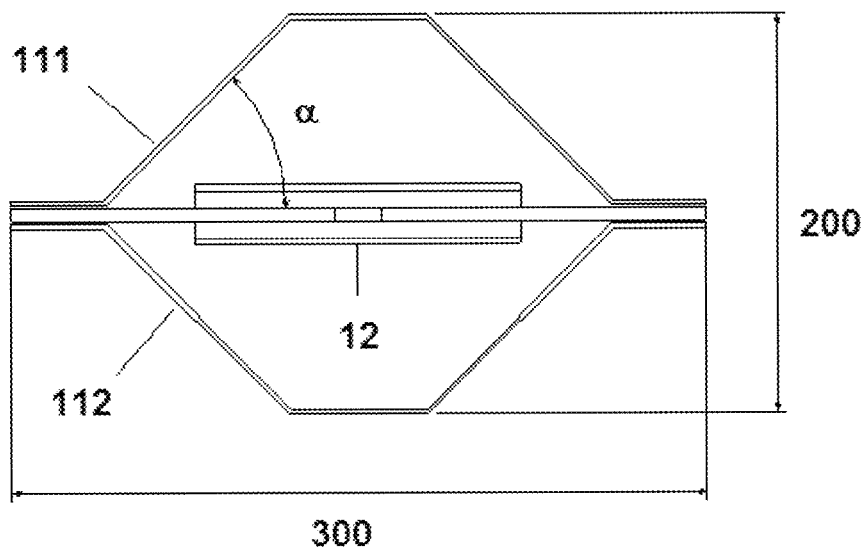
FIGS. 7a, 7b, 7c and 7d show schematically different views of the quasi-parallel working mode of the space shuttle damping and isolating device according to the present invention.
Figure 7B:
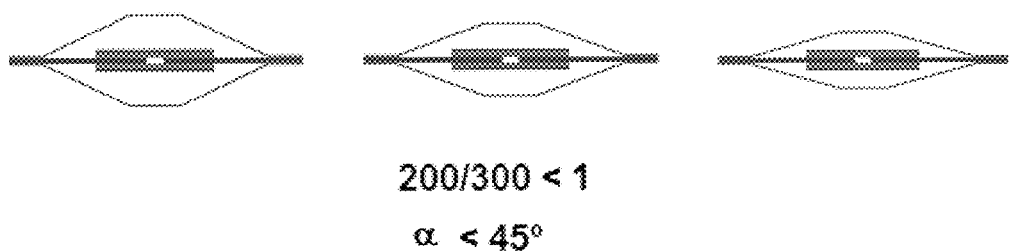
Figure 7C:
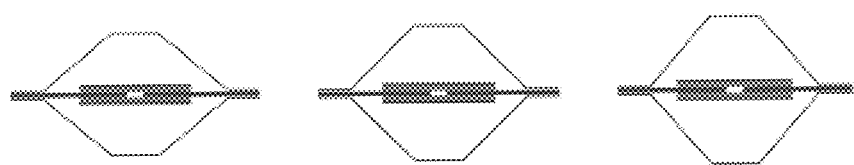
Figure 7D:
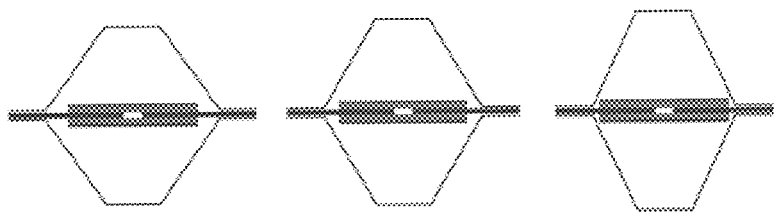

FIGS. 7a-7d show schematically the quasi-parallel working mode of the device 10, as well as the angles and ratios. As such, FIG. 7a shows the still mode configuration of the device 10, such that the stack 111 forms an angle α with the damping component 12. Symmetrically, the stack 112 forms also an angle α with the damping component 12. In the still mode shown in FIG. 7a, the initial angle α is of 45°; the working mode of the device 10 was parallel, this angle α would be maintained throughout the movement of the stacks 111 and 112 with respect to the damping component 12, so that the ratio of the axial-vertical 200 relative displacement (up-down) and of the radial-horizontal 300 relative displacement (right-left) would be equal to 1 (see different positions of the device 10 shown in FIG. 7c). However, in the quasi-parallel mode of the invention, the ratio of the axial-vertical 200 relative displacement (up-down) and of the radial-horizontal 300 relative displacement (right-left) is different from 1, as the angle α is not 45°, which results in the working mode of each elementary unit element 20 being not completely parallel, but quasi-parallel. As it has been previously described, the design of the damping properties and of the stiffness properties can be made individually and through the ratio just mentioned, in such a way that: when the ratio is below 1, the radial-horizontal 300 relative displacement (right-left) is higher than the axial-vertical 200 relative displacement (up-down), the angle α is below 45° and the damping properties in the elementary unit element 20 are higher than the stiffness properties (see representations in FIG. 7b); when the ratio is above 1, the axial-vertical 200 relative displacement (up-down) is higher than the radial-horizontal 300 relative displacement (right-left), the angle α is greater than 45° and the stiffness properties in the elementary unit element 20 are higher than the damping properties (see representations in FIG. 7d).

The device 10 of the invention is sized as to its elementary unit elements 20 to support static and dynamic loads going through the structures of the space shuttle. To that, it is possible to match any stiffness/strength/damping requirement using the adequate configuration of the spring component 11 and of the damping component 12: this means that the concept underlining the invention offers an additional modularity to the design, making it possible to match different isolation requirements (stiffness and damping) at the level of the elementary unit element 20 itself.

The selected materials used for the spring component 11 and for the damping component 12 can be further reviewed if needed, or even combined, accordingly the stiffness, the loads to be supported and the damping requirements and, hence, the design at the level of the elementary unit elements 20 is susceptible of potential optimizations and/or of updates to evolutions of requirements. One possible embodiment (as the one shown in FIG. 2) comprises five leaf springs 113 on each stack 111 and 112, Preferably, the same material forming these leaf springs 113 also configures some of the damping leafs 120 forming the damping component 12 in the embodiment shown in FIG. 2, this material preferably comprising carbon fiber reinforced polymer, CFRP (further explanation of the materials for the damping component 12 will follow).

Each symmetrical stack 111 and 112 configuring the spring component 11 of the elementary unit element 20 comprises a stack of a plurality of leaf springs 113 of certain dimensions: preferably, in the embodiment of FIG. 2, each stack 111 or 112 comprises five leaf springs 113 each, made of CFRP, with the following dimensions: 2 mm thickness, 30 mm width and 200 mm length. The package of the stacks 111 and 112 is guaranteed by means of the edge holes 41 and pads 40, as shown in FIGS. 3a and 3b. Besides, each leaf spring 113 is also drilled at the center, providing an interface hole 42. Thus, the edge holes 41 provide the assembly of the leaf springs 113 in each stack 111 and 112, while the interface holes 42 serve as an interface with other elements.

Each leaf spring 113 also comprises preferably three flat pads 40, preferably rectangular, located at the edges, where the edge holes 41 are, and also at the center, where the interface hole 42 is (see FIGS. 3a and 3b). The flat pads 40 have the following purposes:

provide a flat contact surface;
separate the leaf springs 113;
provide strength compensation to the interface holes 42 and to the edge holes 41;
allow the assembly of the stacks 111 and 112 by further tightening by means of bolts at the edge holes 41;
allow interface inserts tightening by means of inserts at the interface holes 42.

Figure 4B:
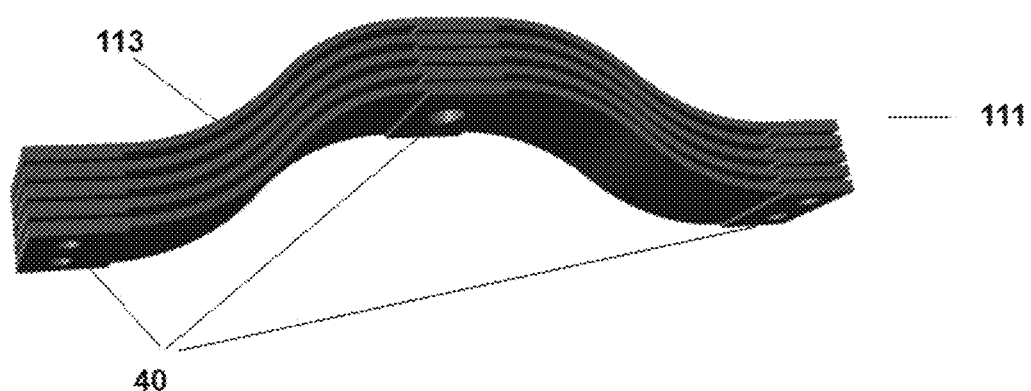
Figure 4C:
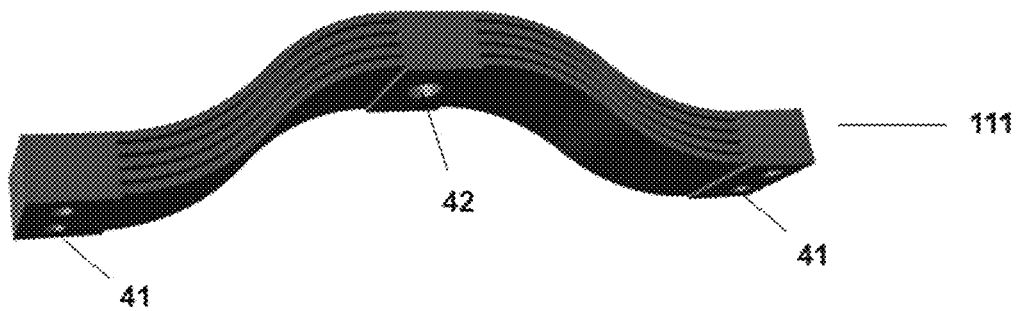

FIGS. 4a, 4b and 4c show the configuration of the stacks, 111 or 112, by means of a plurality of leaf springs 113, preferably five leaf springs 113, that come together at the edges through the flat pads 40 at the edge holes 41, such that the stack formed, 111 or 112, is also properly joined at the interface holes 42 through flat pads 40.

Figure 5:
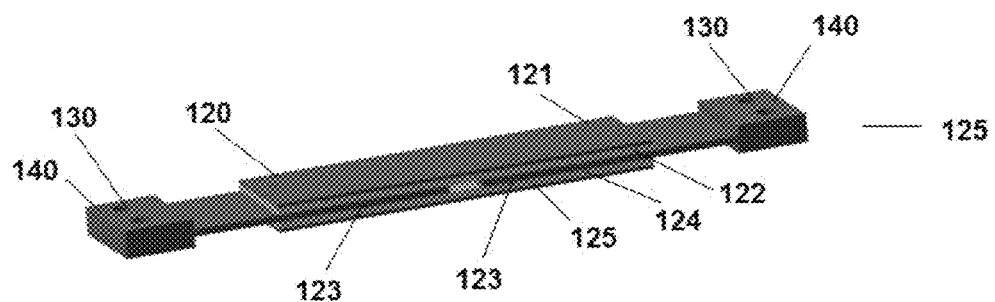
FIG. 5 shows a detailed view of the damping component in the elementary unit element configuring the space shuttle damping and isolating device according to the present invention.

The damping component 12, as shown in FIG. 5, comprises a plurality of stacks 125, preferably three, as shown in the embodiment of the cited FIG. 5. The embodiment of FIG. 5 shows a total of five damping leafs 120 for each of the three stacks 125, making a total of five layers for each stack 125, configured in the sandwich-type, in the following preferred way:

a primary CFRP layer 121;
a damping layer 122, preferably made of silicone rubber;
a third CFRP layer, comprising two symmetric leafs 123 and 123';
a fourth damping layer 124, preferably made of silicone rubber;
a fifth layer of CFRP 125.

The third layer or center layer is formed by two symmetric leaves 123 and 123', allowing relative displacement and shear deformation of the leaves 123 and 123', preferably made of silicone rubber, at each side, therefore providing a simple energy dissipation mechanism. Furthermore, assembly holes 130 at both ends are provided, together with assembly flat pads 140, facilitating the integration with the spring component 11 of the elementary unit element 20, at the edge holes 41.

Figure 6:
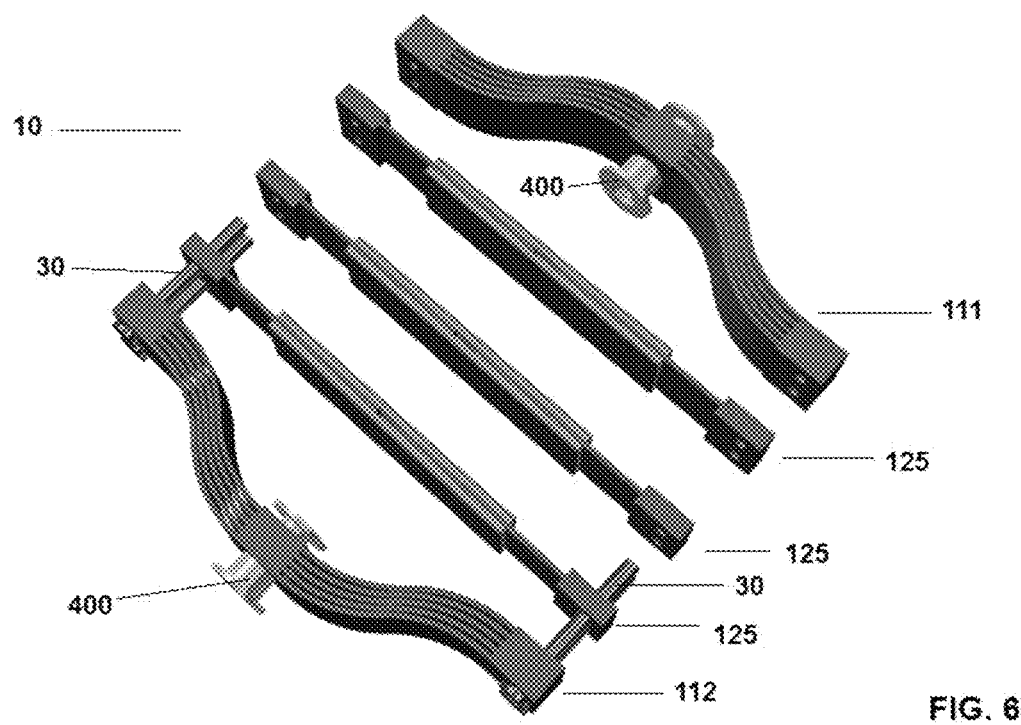
FIG. 6 shows a detailed view of the damping component and of the spring component being joined in order to constitute the elementary unit element configuring the space shuttle damping and isolating device according to the present invention.

Final integration of the above-described parts forming each of the elementary unit elements 20 configuring the complete device 10 used for providing dynamic isolation and damping of dynamic vibrations of the invention is shown in FIG. 6, and will be explained as follows:

the plurality of symmetric leaf springs 113 come together at the edges, through the edge holes 41 and flat pads 40, together with the interface holes 42 and flat pads 40, thus being formed the two symmetric stacks 111 and 112;

the plurality of damping leafs 120 come together at the edges, through the assembly holes 130 and pads 140, thus being formed each of the stacks 125 of the damping component 12.

The assembly of the stacks 111 and 112 configuring the spring component 11, together with the stacks 125 configuring the damping component 12, is preferably made at edge holes 41 mating the holes 130 in the damping component 12, by means of joining elements 30, preferably numbering four, these joining elements preferably comprising stainless steel screwed bolts, which further preload the full packages of stacks of 111, 112 and 125 by tightening nuts on top, this tightening being properly done by means of the flat pads of stacks 111 and 112 at the edges 40, mating the pads 140 at the edges of the stacks 125.

The mechanical interface of the device 10 with the adjacent structures at the space shuttle is provided by means of inserts 400, preferably two, and more preferably being these inserts 400 made of aluminum alloy, such that these inserts are located at the central interface holes 42 of each stack 111 and 112 configuring the spring component 11, also with the help of the central flat pads 40. These inserts 400 are self tightened one against the other up to preload the top and bottom flat surfaces of the stacks 111 and 112. These inserts are preferably screwed in order to provide a quick and easy interface with the rest of the structures in the space shuttle. FIG. 6 shows the way the total assembly of device 10 is formed.

Furthermore, the elementary unit elements 20 are preferably manufactured in composite material, so that the device 10 of the invention can be used in composite structures within a space shuttle.

Although the present invention has been fully described in connection with preferred embodiments, it is evident that modifications may be introduced within the scope thereof, not considering this as limited by these embodiments, but by the contents of the following claims.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device capable of providing dynamic isolation and damping of dynamic vibrations originated in a launch vehicle of a space shuttle reaching at least one of a payload or satellite, the device interfering a load path from the launch vehicle to the space shuttle, the device comprising:

a plurality of elementary unit elements, each of the elements comprising a spring component, providing stiffness properties of each of the elementary unit elements, and a damping component, providing damping properties of each of the elementary unit elements, the spring component being formed by two symmetric stacks, characterized in that the damping component is not arranged in the load path from the launch vehicle to the space shuttle, ends of the damping component being joined to ends of the stacks, and in that each line joining each end of the stacks with the top or bottom parts of the stacks forms an angle ($\alpha$) with the damping component, so that the damping properties and the stiffness properties of the device are designed individually by the variation of the angle ($\alpha$).

2. The device according to claim 1 wherein the two symmetric stacks have a radial relative displacement and an axial relative displacement, such that a ratio of the axial relative displacement and of the radial relative displacement is directly related to the angle ($\alpha$) in such a way that: when the ratio is <1, the angle ($\alpha$) is <45°, when the ratio is equal to 1, the angle ($\alpha$) is of 45°, and when the ratio is >1, the angle ($\alpha$) is >45°.

3. The device according to claim 2 wherein when the ratio is less than 1, the angle ($\alpha$) is less than 45°, so that the damping properties are higher than the stiffness properties in the device.

4. The device according to claim 2 wherein when the ratio is 1, the angle ($\alpha$) is 45°, so that the damping properties and the stiffness properties in the device are equivalent.

5. The device according to claim 2 wherein when the ratio is greater than 1, the angle ($\alpha$) is greater than 45°, so that the stiffness properties are higher than the damping properties in the device.

6. The device according to claim 1, wherein each of the two symmetric stacks comprises a plurality of leaf springs, the damping component comprising a plurality of damping leafs, the stacks and the damping component being joined together at their ends.

7. The device according to claim 6, wherein each leaf spring comprises a plurality of flat pads, with edge holes located at the edges, and an interface hole located at a center.

8. The device according to claim 6, wherein the stacks and the damping component are joined together at each of their ends by mechanically preloaded bolt elements.

9. The device according to claim 1, further comprising 144 elementary unit elements configured for at least one of a space shuttle and a payload in a range of 4.5 to 6 tons.

10. The device according to claim 1, comprising 72 elementary unit elements configured for at least one of a space shuttle and a payload in a range of 3.5 to 4.5 tons.

11. The device according to claim 1, comprising 36 elementary unit elements configured for at least one of a space shuttle and a payload of less than 3.5 tons.

12. The device according to claim 1, wherein the elementary unit elements are manufactured of composite material.

13. The device according to claim 1, wherein the elementary unit elements are manufactured of carbon fiber reinforced polymer, CFRP.

* * * * *